United States Patent
Mogensen

(10) Patent No.: US 7,440,740 B2
(45) Date of Patent: Oct. 21, 2008

(54) METHOD OF TRANSMITTING DATA WHERE IN A FIRST MODE, THE POWER LEVEL IS NOT INDICATED IN A MESSAGE AND AN NPSK MODULATION SCHEME IS USED, AND IN A SECOND MODE, THE POWER LEVEL IS INDICATED IN A MESSAGE IN AN NQAM MODULATION SCHEME IS USED

(75) Inventor: Preben Mogensen, Gistrup (DK)

(73) Assignee: Nokia Corporation, Espoo (FI)

( * ) Notice: Subject to any disclaimer, the term of this patent is extended or adjusted under 35 U.S.C. 154(b) by 179 days.

(21) Appl. No.: 10/474,129

(22) PCT Filed: Apr. 3, 2002

(86) PCT No.: PCT/IB02/02155

§ 371 (c)(1),
(2), (4) Date: Nov. 18, 2003

(87) PCT Pub. No.: WO02/085059

PCT Pub. Date: Oct. 24, 2002

(65) Prior Publication Data

US 2004/0105460 A1    Jun. 3, 2004

(30) Foreign Application Priority Data

Apr. 4, 2001    (GB) ................... 0108516.6

(51) Int. Cl.
H04B 1/18    (2006.01)
(52) U.S. Cl. .............. 455/280; 455/295; 455/296; 455/303

(58) Field of Classification Search .......... 455/452.2, 455/69, 504, 522, 280, 295, 296, 303
See application file for complete search history.

(56) References Cited

U.S. PATENT DOCUMENTS

| | | | |
|---|---|---|---|
| 5,732,077 A | 3/1998 | Whitehead | 370/349 |
| 5,764,699 A * | 6/1998 | Needham et al. | 375/261 |
| 5,918,174 A * | 6/1999 | Chennakeshu et al. | 455/427 |
| 6,385,462 B1 * | 5/2002 | Baum et al. | 455/522 |
| 6,597,723 B1 * | 7/2003 | Zeira et al. | 375/130 |
| 6,754,473 B1 * | 6/2004 | Hwang et al. | 455/101 |
| 6,873,613 B1 * | 3/2005 | Dent | 370/347 |
| 6,952,410 B2 * | 10/2005 | Gopalakrishnan et al. | 370/355 |
| 2002/0155835 A1 * | 10/2002 | Pankaj et al. | 455/439 |

FOREIGN PATENT DOCUMENTS

| | | |
|---|---|---|
| EP | 1 017 127 A | 7/2000 |
| WO | WO 00/13443 | 3/2000 |
| WO | WO 00/56103 | 9/2000 |

* cited by examiner

*Primary Examiner*—Philip J Sobutka
(74) *Attorney, Agent, or Firm*—Squire, Sanders & Dempsey L.L.P.

(57) ABSTRACT

A method and apparatus for transmitting data from a first node to a second node of a communication system are provided. The method includes, in a first mode of operation, transmitting data via a first communication channel in which the power level of the channel at the first node is not indicated to the second node, and in a second mode of operation transmitting the data via said first communication channel and indicating the power level of the channel at the first node to the second node.

29 Claims, 3 Drawing Sheets

METHOD OF TRANSMITTING DATA WHERE IN A FIRST MODE, THE POWER LEVEL IS NOT INDICATED IN A MESSAGE AND AN NPSK MODULATION SCHEME IS USED, AND IN A SECOND MODE, THE POWER LEVEL IS INDICATED IN A MESSAGE IN AN NQAM MODULATION SCHEME IS USED

BACKGROUND OF THE INVENTION

1. Field of the Invention

The present invention relates to a method and apparatus for transmitting data from a first node to a second node of a communication system. In particular, but not exclusively, the invention relates to the transmission of data in a first and a second mode of operation between first and second nodes in a telecommunication system.

2. Description of the Related Art

As is known in the art, analogue cellular systems such as the public switched telephone network (PSTN) are referred to as first generation telecommunication systems. Digital systems such as the global system for mobile communication (GSM) have been developed and are classed as second generation systems. Third generation (3G) systems are now being designed which can support multi-media communications. The standards for this 3G system are being specified by the third generation partnership project (3GPP). These 3G mobile communication systems are often referred to as universal mobile telecommunication systems (UMTS).

In standardizing this new technology wide band code division multiple access (CDMA) (WCDMA) has emerged as the most widely accepted air interface. Indeed WCDMA has been selected as the standard for the UMTS Terrestrial Radio Access (UTRA) air interface for Frequency Division Duplexing (FDD) operation. The 3GPP has a number of technical specification groups (TSG) whose aim is to the specify whole radio access network (RAN) for the third generation mobile systems. These specifications are eventually adopted as industry standards.

One of the major steps in the evolution of these 3G systems is to provide higher capacity, data rates and media services. In order to support higher peak rates techniques such as adaptive modulation and coding (AMC) have been proposed.

AMC is the application of a particular modulation and coding scheme (MCS) depending upon the particular circumstance. Two principle schemes have been proposed. These are N phase shift keying (NPSK) which is a modulation scheme which contains only phase information, and N quadrature amplitude modulation (NQAM) in which the modulation includes phase and amplitude information. The MCS can be selected on a frame by frame basis based upon some measurement made by user equipment (UE) in the network.

In systems where only NPSK modulation is used the UE can make phase estimation from the common pilot channel (CPICH). Demodulation can be carried out for NPSK even if the amplitude level of the transport channel carrying the data is unknown.

If a higher order modulation, such as NQAM, is used both amplitude and phase information are required for demodulation. The phase information can be obtained from the CPICH but in order to calculate the amplitude information correctly the UE must know the power level for the transport channel relative to the CPICH power levels.

The problem in systems in which such high order modulation may be used is thus that the power of the transport channel cannot vary on a frame by frame (or even slot-by slot) basis without an unacceptably high quantity of signaling being used for each frame to identify that transport channel power. This signaling takes up capacity on the communication link.

It is an aim of the present invention to at least partly mitigate the above-mentioned problems.

BRIEF SUMMARY OF THE INVENTION

According to a first aspect of the present invention there is provided a method of transmitting data from a first node to a second node of a communication system, the method comprising the steps of:

in a first mode of operation, transmitting said data via a first communication channel in which the power level of the channel at said first node is not indicated to the second node; and in a second mode of operation transmitting said data via said first communication channel and indicating the power level of the channel at said first node to said second node.

According to a second aspect of the present invention there is provided a method of transmitting data from a first node to a second node of a communication system comprising the steps of:

measuring channel quality in a first communication channel via which said data is to be transmitted;

if said measured channel quality falls below a predetermined threshold value, transmitting said data in a first mode of operation in which the power level of the channel at said first node is not indicated to the second node; and if said measured channel quality is equal to or better than the predetermined threshold value, transmitting said data signal in a second mode of operation in which the power level of the channel at said first node is indicated to said second node.

According to a third aspect of the present invention there is provided radio resource management means which comprises power control apparatus and further comprising:

power residue measuring means for measuring residue power resources in the communication system at said first node; and power allocating means for allocating the residue power to at least one user of the first communication channel; wherein when residue power is allocated to said at least one user, the power control apparatus is arranged to output a mode control signal which indicates the first mode of operation should be used for transmission.

Embodiments of the present invention thus allow transport channel power to be varied on a frame by frame basis. Radio resource management can then be carried out so that available power which is left over from other services can be allocated moment by moment. This helps optimize power allocation to different users and car increase the communication link capacity.

BRIEF DESCRIPTION OF THE DRAWINGS

Advantageously embodiments of the present invention can be applied to the transport channel which supports high speed downlink packet access (HSDPA).

For a better understanding of the present invention reference will now be made, by way of example only, to the accompanying drawings in which.

In the drawings like reference numerals refer to like parts.

DETAILED DESCRIPTION OF THE INVENTION

Figure 1:
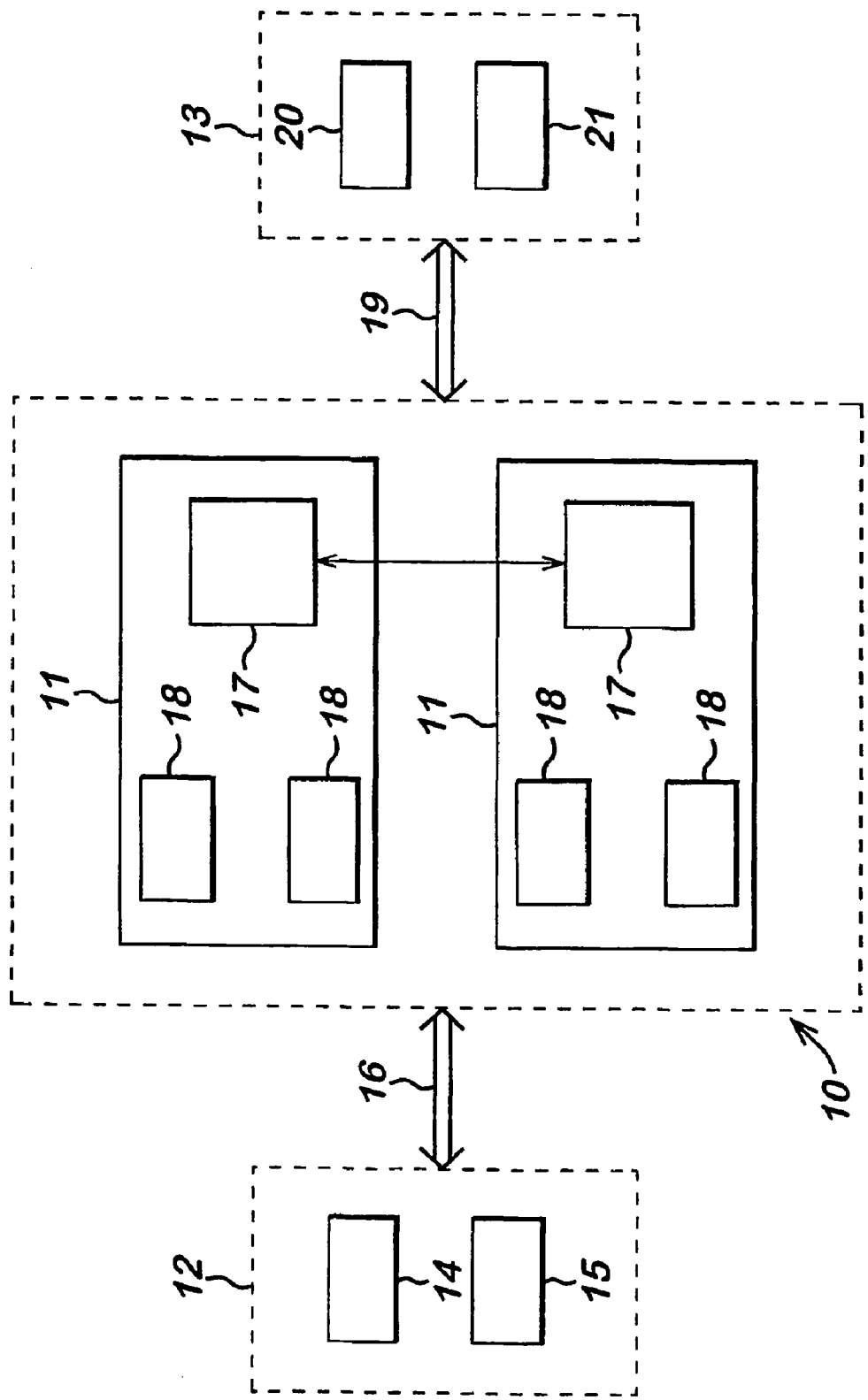
FIG. 1 illustrates UTRAN architecture.

FIG. 1 shows how the general layout of a universal terrestrial radio access network (UTRAN) 10 including one or more radio network sub systems (RNS) 11 which are connectable to user equipment (UE) 12 and core network (CN) 13.

The UE can include mobile equipment (ME) 14 which can comprise a mobile station (MS) and a UMTS subscriber identifier module (USIM) 15, such as a smart card which holds subscriber identity information. The UE and UTRAN communicate with each other over the Uu interface 16. This is a wireless radio interface. Communication from the UE to the UTRAN is termed the uplink and from the UTRAN to the UE the downlink.

Radio network controllers (RNC) 17 in an RNS 11 control radio resources and control management of connections over the Uu interface 16 with Node-B 18. Node-B (which is analogous to a GSM base station) converts and manages dataflow over the Uu interface.

The RNC's 17 communicate with the CN 13 over the Iu interface 19 (this is analogous to the A-interface in GSM for circuit switches applications and Gb-interface in GSM for packet switched applications). The CN 13 can include the mobile services switching centre (MSC) and a visitor location register (VLR) 20 together with a gateway MSC 21 via which the UMTS public land mobile network (PLMN) can be connected to other core service (CS) networks.

The Uu interface 16 between the UE and UTRAN is a wireless interface. Many 3G wireless systems are to be based on wide band code division multiple access. These are being standardized by the International Telecommunication Union (ITU) in its International Mobile Telecommunications in 2000 (IMT-2000) initiative. Two such leading proposals are CDMA 2000 and WCDMA. In the following example reference is made specifically to a WCDMA system. It will be understood that the present invention is not only limited in its use to such WCDMA systems but is indeed also applicable to the evolution of CDMA.

In UTRA, data generated at higher levels is carried over the air interface via transport channels. These are mapped in the physical layer to different communication channels which are physical channels. Three types of transport channels exist which can be used to transmit packet data. These are dedicated channels, common channels and shared transport channels.

A dedicated channel resource is identified by a certain code on a certain frequency and is dedicated to a single user. In WCDMA user information bits are spread over a wide band width by multiplying the user data with pseudo-random bits called chips. These are derived from CDMA spreading codes as is known in the art.

A common channel is a resource which is divided between the sum total of users in a cell. In the uplink the random access channel (RACH) is the common channel. In the downlink the forward access channel (FACH) is the common channel.

Shared channels can be used to communicate bursty packet data and these share a single physical channel, indicated with a unique orthogonal variable spreading factor (OVSF) code between users via time division multiple access (TDMS).

In addition to these transport channels various other communication channels exist such as for example, the common pilot channel (CPICH). The CPICH is used at a node or point in the communication system where data in the form of a data signal is received. In such receivers digitized input samples are received from RF front end circuitry as I (imaginary) and Q (real) branches. This is because the transmitted signal over the air interface has a "complex" nature. It has a real and imaginary part due to the amplitude and phase of the signal. Code generators and correlators perform de-spreading and integration on the user symbols contained in the data signal. A channel estimator uses known data, transmitted via the CPICH as symbols, to estimate the channel state and this can then be removed from the data signal to reveal the true data.

One transport channel which has been proposed by the 3GPPTSG for the RAN is a transport channel to support high speed downlink packet access (HSDPA) this transport channel is termed the HSDSCH. The channel allows high bit rates for data packets transmitted via the downlink in a communication system. That is from Node B to UE in UMTS.

Various technologies have been proposed for HSDPA such as fast cell selection (FCS) and multiple input multiple output antenna processing (MIMO). Another is adaptive modulation and coding (AMC).

The principle of AMC is to change the modulation and coding format in accordance with variations in the channel conditions, subject to system restrictions. The channel conditions can be estimated e.g. based on feedback from the receiver. In a system with AMC, users in favourable positions e.g. users close to a cell site are typically assigned higher order modulation with higher code rates (e.g. 64 QAM with $R=\frac{3}{4}$ Turbo Codes), while users in unfavourable positions e.g. users close to a cell boundary, are assigned lower order modulation with lower code rates (e.g. QPSK with $R=\frac{1}{2}$ Turbo Codes). The main benefits of AMC are, a) higher data rates are available for users in favourable positions which in turn increases the average throughput of the cell and b) reduced interference variation due to link adaptation based on variations in the modulation/coding scheme instead of variations in transmit power.

In essence AMC mean that there are certain modulation and coding schemes (MCS) which can be selected during transmission of data on a frame by frame basis. There are two principle modulation schemes available. These are phase modulation such as N phase shift keying (NPSK) and amplitude modulation such as N quadrature amplitude modulation (NQAM).

Phase modulation essentially involves changes of phase of a carrier signal depending upon whether a bit 0 or bit 1 is to be transmitted. In two level phase shift keying (2PSK) the phase of the carrier is modulated by 180° depending upon whether a 0 or 1 is transmitted. In Quadrature phase shift keying (4PSK) the single frequency carrier frequency is split into 2 separate carriers of the same frequency but having a 90° phase split between them. Each of these 2 carriers can be modulated with a 180° phase change to thus provide four modulated signals.

Quadrature amplitude modulation (QAM) combines amplitude modulation with phase modulation. The carrier signal frequency is kept constant but is divided into phases. The number of phases may be selected according to the rate of transfer of data required. Each phase is amplitude modulated.

Figure 2:
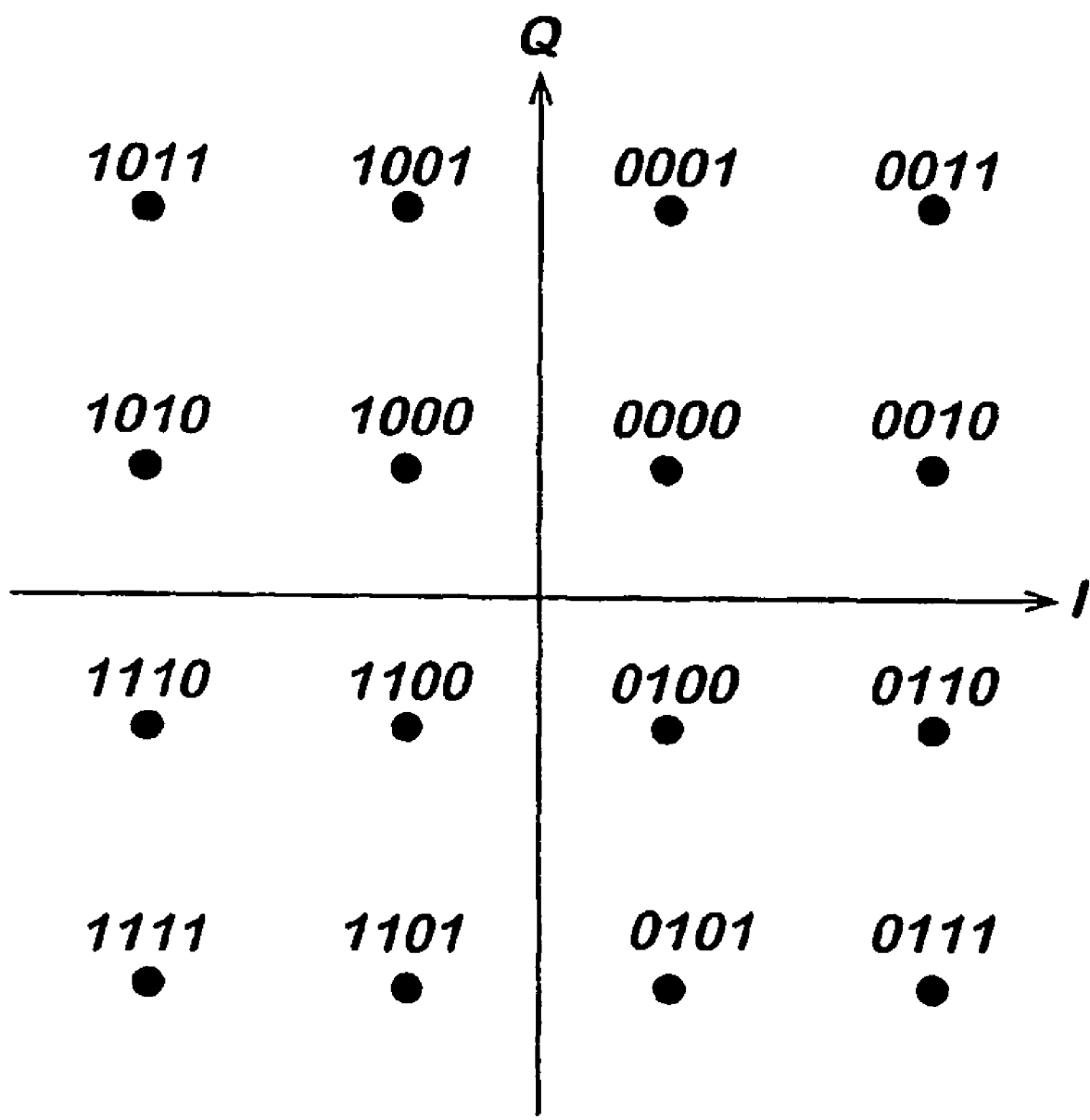
FIG. 2 illustrates a QAM constellation.

FIG. 2 illustrates a QAM system. The sixteen points are the constellation points in a QAM constellation. Each of these is located by virtue of a unique phase and amplitude associated with that point. The I and Q axis represent the imaginary and real components of the transmitted signal respectively.

Each of the points Corresponds to a transmitted symbol. That is to say a unique sequence of binary bits which is allocated to that particular combination of phase and amplitude. A receiver receiving a signal having a certain combination of phase and amplitude would thus be able to identify the fact that the transmitter has sent one particular symbol. Since this symbol has a unique sequence of bits associated with it the receiver symbol can be used to reconstruct an original bit sequence. In this way a decoder translates multi-dimensional signals, (the phase and amplitude dimensions) into a symbol estimate. The signal has a real and imaginary part which are dependent on these characteristics. This symbol estimate corresponds uniquely to a sequence of bit estimates according to the modulation scheme used.

In accordance with the present invention which MCS is selected is determined by some measurement made on the communication link between two nodes in the communication system. For example in the case of a downlink the measurement can be made via the UE by measuring the signal to interference ratio (SIR) on the SPICH. Other alternatives are possible upon which the selection of the MCS can be based (for example, measuring the bit error rate (BER) on the CPICH). These measurements can give an indication of the channel quality. The UE can then signal the measured channel quality to the Node B which can use this information to select an appropriate MCS.

In accordance with embodiments of the present invention when using AMC power control is carried out not via a fast power control loop but rather by keeping the power level of the physical channel carrying HSDSCH at either a fixed level or a semi static level. A semi static level is a state in which the power level remains fixed over short periods of time but is allowed occasionally to jump to a new level. The MCS is then selected on the basis of the communication link quality. In the case of HSDPA the downlink channel quality is measured at the UE (which thus comprises a receiver node) and then signaled to the Node B (which thus comprises a transmitter node). If the channel quality is good, which can be detected by comparing the measured channel quality against a predetermined threshold value, higher order modulation can be used. For example NQAM. This provides a higher data rate. If the channel quality is relatively poor, indicated by the measured channel quality being below a predetermined threshold, a lower order modulation technique such as NPSK can be used. This offers a lower data rate.

Examples of possible MCS sets are shown below in table 1 for example 0.6 ms or 10 ms. In table 1 the MCS 1-4 can be considered as NPSK and MCS 5-7 as NQAM Embodiments of the present invention utilize the fact that NPSK modulation only carries phase information. A UE can do the demodulation for NPSK even if it does not know the power level of the transmitted data at the transmitter relative to the CPICH.

If a higher order modulation such as 16 QAM or 64 QAM is used to encode the data at the transmitter node the amplitude of the power level at the transmitter node i.e. Node B, must be known. This is because both amplitude and phase information define the points in an NQAM constellation. Thus the UE must obtain both the amplitude and phase information in order to demodulate the data. The phase information can be obtained from the CPICH but in order to obtain the necessary amplitude information the UE must be informed of the power level of the communication channel carrying the data at the transmitter relative to the CPICH.

Whether or not to use NPSK or NQAM is selected by measuring the quality of the communication channel over which the data is transmitted between the first and second nodes in communication system. When the channel quality is good, for example when the UE is close to a Node B, higher order modulation can be used such as 64 QAM and 16 QAM. When the channel quality is less good, for example when the UE is close to a cell boundary, a lower order modulation such as QPSK can be used. Under these latter conditions the communication channel power level can be varied since the modulation scheme is not amplitude sensitive. This means that the channel power level can be varied on a frame by frame basis. This in turn enables radio resource management to be carried out. A resource management block in the Node B measures available power which is left over from other services. For example circuit switched users. This can then be allocated on a frame by frame basis to HSDPA users. Power can be allocated to users of a channel which is NPSK modulated i.e. those users furthest away from the node B, where extra power is of most use. Alternatively users of a channel which is NQAM modulated can have their MCS selected to an NPSK scheme. Since users of a channel which is NQAM modulated will tend to be physically closer to the Node B, hence a better channel quality, an increase in power may not be necessary in which case it may be preferable to retain the

TABLE 1

| | Chip Rate = 3.84 Mcps | | | SF = 32 | | | |
|---|---|---|---|---|---|---|---|
| | 20 codes | | | 1 code | | | |
| | Info | | | Info | | | Frame Size = 3.33 ms |
| | Rate | Info bits/frame | | Rate | Info bits/frame | Code | |
| MCS | (Mbps) | (bits) | (octets) | (Mbps) | (bits) | (octets) | Rate | Modulation |
| 7 | 10.8000 | 36000 | 4500 | 0.54 | 1800 | 225 | 3/4 | 64 |
| 6 | 7.2000 | 24000 | 3000 | 0.36 | 1200 | 150 | 3/4 | 16 |
| 5 | 4.8000 | 16000 | 2000 | 0.24 | 800 | 100 | 1/2 | 16 |
| 4 | 5.4000 | 18000 | 2250 | 0.27 | 900 | 112.5 | 3/4 | 8 |
| 3 | 3.6000 | 12000 | 1500 | 0.18 | 600 | 75 | 3/4 | 4 |
| 2 | 2.4000 | 8000 | 1000 | 0.12 | 400 | 50 | 1/2 | 4 |
| 1 | 1.2000 | 4000 | 500 | 0.06 | 200 | 25 | 1/4 | 4 |

The data rates illustrated in table 1 are shown for a frame size of 3.33 ms. It will be understood that the present invention is not limited to such sizes. Rather the frame size can vary NQAM MCS and not use the extra power. In this way power can be allocated via the resource management block to optimize downlink capacity.

Thus for modulations where only phase information defines the point in the constellation e.g. NPSK the communication system operates in a first mode of operation and can vary the power level in the communication channel carrying the HSDSCH. This need not be communicated to the UE.

When a higher level of modulation is used, such as NQAM, the communication system operates in a second mode of operation in which the power level of the communication channel over which the data is transmitted must be identified to the UE. This is the power level at the transmitter node i.e. the Node B for downlink. The power level may be indicated by signaling the power relative to the power in the CPICH for each frame. This may be done using the broadcast channel (BCH)

The network may broadcast a power level via the BCH at all times but this might not be updated by the resource management block when residual power from the node is allocated to a channel. This is acceptable when a NPSK modulation scheme is used. However the correct power level, i.e. the power level plus any allocated power, must be identified when higher modulation schemes are used. This means that the UE should only assume that indicated power level is accurate if NQAM modulation is being used. If NQAM modulation is used the correct power level should be identified. The UE should not assume anything about the power level of the communication channel carrying HSDSCH when the modulation is NPSK.

Figure 3:
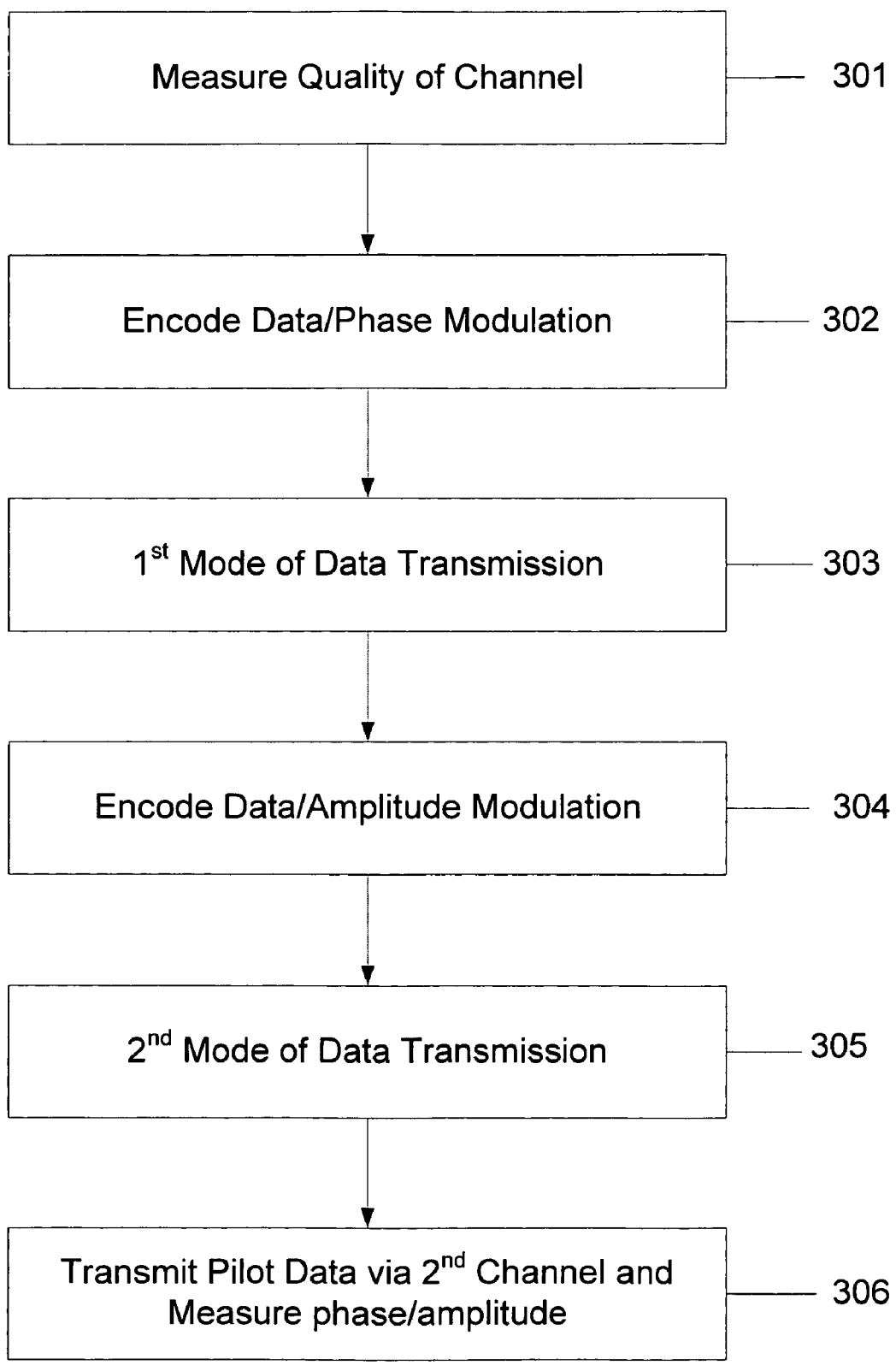
FIG. 3 illustrates a flowchart of an exemplary method of the invention.

FIG. 3 illustrates a flowchart of an exemplary method of the invention, which has been generally described above. The method begins at step 301, where the quality of the first communication channel is measured and responsive to the measured quality falling below a predetermined threshold value, transmitting data in a first mode of operation, which is further described herein. The method continues to step 302, where the data is encoded using a phase modulation scheme. The method then continues to step 303, where in a first mode of operation, transmitting data via a first communication channel in which the power level of the channel at the first node is not indicated to the second node, and in a second mode of operation transmitting the data via the first communication channel and indicating the power level of the channel at the first node to the second node. The method then continues to step 304, where the data is encoded using an amplitude dependent modulation scheme. The method then continues to step 305, where in a second mode of operation transmitting the data via the first communication channel and indicating the power level of the channel at the first node to the second node. The method then continues to step 306, where via a second communication channel, transmitting pilot data from the first node to the second node in addition to the transmitted data, and measuring amplitude information associated with the transmitted data responsive to comparing the amplitude of the pilot data with the amplitude of the transmitted data.

Embodiments of the present invention provide the advantage that at a cell edge where there is a need for an MCS containing less than a maximum number of codes this can be provided for whilst the power in those remaining code channels can be increased.

It will be understood that the present invention is not limited by the specific examples herein described. Rather there are several variations and modifications which can be made to the disclosed examples without departing from the scope of the present invention as defined in the appended claims.

The invention claimed is:

1. A method of transmitting data from a first node to a second node of a communication system, comprising:
   in a first mode of operation, transmitting said data via a first communication channel in which the power level of the channel at said first node is not indicated to the second node; and
   in a second mode of operation transmitting said data via said first communication channel and indicating the power level of the channel at said first node to said second node; and
   measuring the quality of said first communication channel and responsive to said measured quality falling below a predetermined threshold value, transmitting said data in said first mode of operation,
   wherein in the first mode of operation, the data is encoded using a modulation scheme containing only phase information, and in the second mode of operation, the data is encoded using a phase and amplitude information modulation scheme.

2. The method as claimed in claim 1, further comprising:
   prior to transmitting data via said first mode of operation, encoding said data using a phase modulation scheme.

3. The method as claimed in claim 1, further comprising:
   prior to transmitting data via said second mode of operation, encoding said data using an amplitude dependent modulation scheme.

4. The method as claimed in claim 1, further comprising:
   via a second communication channel, transmitting pilot data from said first node to said second node in addition to said transmitted data and measuring amplitude information associated with said transmitted data responsive to comparing the amplitude of said pilot data with the amplitude of said transmitted data.

5. The method as claimed in claim 1, further comprising:
   subsequent to the measuring communication channel quality, encoding said data prior to transmission with an NPSK modulation scheme.

6. The method as claimed in claim 1, further comprising:
   during said second mode of operation keeping the power level of said first communication channel at said first node at least semi static.

7. The method as claimed in claim 1, further comprising:
   during said first mode of operation allowing the power level of the first communication channel to vary.

8. The method as claimed in claim 1, further comprising:
   during said first mode of operation not informing said second node of any variation of power level in the first communication channel.

9. The method as claimed in claim 1, further comprising:
   via a second communication channel, transmitting pilot data from said first node to said second node in addition to said transmitted data and measuring phase information associated with said transmitted data responsive to comparing the phase of said pilot data with the phase of said transmitted data.

10. The method as claimed in claim 9 wherein said second communication channel comprises a common pilot channel (CPICH).

11. The method as claimed in claim 1, further comprising:
    measuring the quality of said first communication channel and responsive to said measured quality being equal to or greater than a predetermined threshold value transmitting said data in the second mode of operation.

12. The method as claimed in claim 11, further comprising:
subsequent to the measuring communication channel quality encoding said data prior to transmission with an NQAM modulation scheme.

13. The method as claimed in claim 1 wherein said communication system comprises a telecommunication system.

14. The method as claimed in claim 13 wherein said first node comprises a UMTS terrestrial radio access network and said second node comprises user equipment.

15. The method as claimed in claim 13 wherein said first communication channel comprises a downlink.

16. The method as claimed in claim 13 wherein said first communication channel comprises a transport channel.

17. The method as claimed in claim 13 wherein said first communication channel comprises a high speed downlink packet access transport channel.

18. The method as claimed in claim 13 further comprising:
indicating the power level of the first communication channel to said second node by transmitting power information from the said first node to the second node via a broadcast channel (BCH).

19. A method of transmitting data from a first node to a second node of a communication system comprising:
measuring channel quality in a first communication channel via which said data is to be transmitted;
if said measured channel quality falls below a predetermined threshold value, transmitting said data in a first mode of operation in which the power level of the channel at said first node is not indicated to the second node; and
if said measured channel quality is equal to or better than the predetermined threshold value, transmitting said data signal in a second mode of operation in which the power level of the channel at said first node is indicated to said second node,
wherein in the first mode of operation, the data is encoded using a modulation scheme containing only phase information, and in the second mode of operation, the data is encoded using a phase and amplitude information modulation scheme.

20. The method as claimed in claim 19, further comprising:
prior to transmission of said data in the first mode of operation, encoding the data signal with a phase modulation scheme.

21. The method as claimed in claim 19, further comprising:
prior to transmission of said data in the second mode of operation, encoding the data signal with an amplitude dependent modulation scheme.

22. The method as claimed in claim 19, further comprising:
indicating the power level of said first communication channel at said first node by measuring the power level at the first node and transmitting information indentifying said measured power level from said first node to said second node via a broadcast channel (BCH).

23. A power control apparatus for controlling the power level of a first communication channel used for transmitting data from a first node to a second node of a communication system, the power control apparatus comprises:
measuring means arranged to measure the quality of said first communication channel;
comparison means arranged to compare a measured channel quality with a predetermined threshold quality and output a mode control signal in response thereto;
indicating means responsive to said mode control signal for outputting, in a second mode of operation, information which indicates the power level of the first communication channel at said first node to the said second node,
wherein in a first mode of operation, the data is encoded using a modulation scheme containing only phase information, and in the second mode of operation, the data is encoded using a phase and amplitude information modulation scheme, and
wherein during a first mode of operation in which said mode control signal indicates a channel quality below a predetermined threshold, said indicating means is disabled so that said information is not output.

24. The power control apparatus as claimed in claim 23, further comprising:
an encoder arranged to be responsive to the mode control signal from said comparison means, the encoder includes means for encoding data via NPSK in a first mode of operation and via NQAM in a second mode of operation.

25. The power control apparatus as claimed in claim 23, wherein the measuring means is arranged to measure the signal to interference ratio (SIR) of the first communication channel.

26. The power control apparatus as claimed in claim 23, wherein the measuring means is arranged to measure the bit error rate (BER) of the first communication channel.

27. The power control apparatus as claimed in claim 23, wherein the first node comprises a Node B in a UTRAN and the second node comprises user equipment.

28. The power control apparatus as claimed in claim 23, wherein said first communication channel comprises a high speed downlink packet access transport channel (HSDSCH).

29. A radio resource management means comprising the power control apparatus of claim 23, further comprising:
power residue measuring means for measuring residue power resources in the communication system at said first node; and
power allocating means for allocating the residue power to at least one user of the first communication channel; wherein
when residue power is allocated to said at least one user, the power control apparatus is arranged to output a mode control signal which indicates the first mode of operation should be used for transmission.

* * * * *